United States Patent
Colditz et al.

(10) Patent No.: US 7,139,357 B2
(45) Date of Patent: Nov. 21, 2006

(54) REACTOR SERVICING PLATFORM (75) Inventors: Dennis Colditz, Downingtown, PA (US); Vernon Walter Pence, San Jose, CA (US); Terry L. Chapman, Los Gatos, CA (US); Michael Jamie Baron, New Lenox, IL (US); Robert David Geier, Woodridge, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/005,977

(22) Filed: Dec. 7, 2004

(65) Prior Publication Data

US 2006/0140328 A1    Jun. 29, 2006

Related U.S. Application Data

(62) Division of application No. 09/683,823, filed on Feb. 20, 2002, now Pat. No. 6,856,663.

(51) Int. Cl.
G21C 19/00 (2006.01)
(52) U.S. Cl. .................. 376/260; 376/268; 376/263
(58) Field of Classification Search ........ 376/260–263, 376/206, 268
See application file for complete search history.

(56) References Cited

U.S. PATENT DOCUMENTS

| | | |
|---|---|---|
| 3,393,026 A | 7/1968 | Gregson |
| 3,960,242 A | 6/1976 | Saxonmeyer |
| 3,967,741 A | 7/1976 | Hoffmeister |
| 3,994,365 A | 11/1976 | Petermann et al. |
| 4,078,969 A | 3/1978 | Garin |
| 4,080,254 A | 3/1978 | Poindexter |
| 4,115,193 A | 9/1978 | Sepelak |
| 4,192,558 A | 3/1980 | Wade |
| 4,200,172 A | 4/1980 | Meuschke et al. |
| 4,288,292 A | 9/1981 | Hardin, Jr. et al. |
| 4,401,619 A | 8/1983 | McEdwards |
| 4,505,874 A | 3/1985 | Warren et al. |
| 4,639,351 A | 1/1987 | Forner et al. |
| 5,183,625 A | 2/1993 | Batistoni |
| 5,241,572 A * | 8/1993 | Matthews ................. 376/272 |
| 5,254,835 A | 10/1993 | Dalke et al. |

(Continued)

FOREIGN PATENT DOCUMENTS

FR     2373858     11/1977

(Continued)

OTHER PUBLICATIONS

Merriam Webster's Collegiate Dictionary, 10th Edition, p. 891.*

*Primary Examiner*—Ricardo Palabrica
(74) *Attorney, Agent, or Firm*—Armstrong Teasdale LLP (57) ABSTRACT

A method of servicing a nuclear reactor during a reactor outage is provided. The reactor includes a primary containment vessel and a reactor pressure vessel positioned in the primary containment vessel. The method includes positioning a servicing platform above the reactor pressure vessel and performing predetermined servicing operations on the reactor. The servicing platform includes a frame having a plurality of interconnected beams, a support structure attached to the frame, and a floor attached to a top of the frame. The floor includes a reactor access opening sized to permit access to the reactor pressure vessel. The servicing platform also includes at least one auxiliary platform movably coupled to the frame and extending into the access opening. The at least one auxiliary platform is movable along a perimeter of the access opening of the floor.

10 Claims, 6 Drawing Sheets

U.S. PATENT DOCUMENTS

| | | |
|---|---|---|
| 5,291,531 A | 3/1994 | Baversten et al. |
| 5,351,277 A | 9/1994 | Goto et al. |
| 5,600,686 A | 2/1997 | Stoss |
| 5,687,207 A | 11/1997 | Meuschke |
| 5,774,513 A | 6/1998 | Urko |

FOREIGN PATENT DOCUMENTS

| | | |
|---|---|---|
| JP | SHO57 161273 | 10/1982 |
| JP | 07113896 | 5/1995 |

* cited by examiner

REACTOR SERVICING PLATFORM

This application is a divisional of U.S. patent application Ser. No. 09/683,823, filed Feb. 20, 2002, now U.S. Pat. No. 6,856,663, which is hereby incorporated by reference and is assigned to assignee of the present invention.

BACKGROUND OF THE INVENTION

This invention relates generally to nuclear reactor, and more particularly to a service platform for use in a nuclear reactor.

A reactor pressure vessel (RPV) of a boiling water reactor (BWR) typically has a generally cylindrical shape and is closed at both ends, e.g., by a bottom head and a removable top head. A top guide, sometimes referred to as a grid is spaced above a core plate within the RPV. A core shroud, or shroud, surrounds the core plate and is supported by a shroud support structure. The core shroud is a reactor coolant flow partition and structural support for the core components. Particularly, the shroud has a generally cylindrical shape and surrounds both the core plate and the top guide. A removable shroud head is coupled to a shroud head flange at the top of the shroud.

During refueling of a nuclear reactor, the majority of the servicing operations are performed from a bridge system that spans the refueling floor and the reactor and fuel storage pool cavities. These bridges typically have a straight four to eight foot wide walkway along their length and can be positioned above the reactor or refueling pool cavity. To clear the hand rails and other structures at the edge of the reactor cavity or service pools, the refuel bridge must be elevated about five feet above the floor surface.

In use, the bridge is moved to the desired position above the reactor and personnel work along the walkway of the bridge. When working over a round reactor vessel such as a boiling water reactor, access to a specific azimuth zone of the round reactor vessel is restricted for any given placement of the bridge because of shape of the bridge. With existing bridge access, the number of work activities, and number of personnel that can perform work at the same time is limited. The use of refuel bridges and auxiliary bridges is the most efficient known method of work access for achieving productivity for plant outage schedules.

The type of work required to service a nuclear plant would be enhanced by access to the reactor along the radial and tangential directions of the vessel or component. A normal bridge system can only accomplish radial or tangential alignment at the specific azimuth positions of 0, 90, 180, or 270 degrees. Radial and tangential alignment can never be accomplished simultaneously. Therefore, personnel and equipment may not have the optimal angle of access for visual observation or equipment manipulation.

BRIEF DESCRIPTION OF THE INVENTION

In one aspect, a reactor servicing platform for a nuclear reactor is provided. The nuclear reactor includes a reactor pressure vessel positioned in a primary containment and at least one refuel bridge. The primary containment includes a refueling floor, and the servicing platform includes a frame, a support structure, and a floor covering the frame. The floor includes a reactor access opening sized to permit access to the reactor pressure vessel.

In another aspect, a nuclear reactor is provided that includes a primary containment vessel, a reactor pressure vessel positioned in the primary containment vessel, and a reactor servicing platform. The servicing platform includes a frame, a support-structure, and a floor covering the frame. The floor includes a reactor access opening sized to permit access to the reactor pressure vessel.

In another aspect, a method of servicing a nuclear reactor during a reactor outage is provided. The reactor includes a primary containment vessel and a reactor pressure vessel positioned in the primary containment vessel. The method includes positioning a servicing platform above the reactor pressure vessel, and performing predetermined servicing operations on the reactor. The servicing platform includes a frame, a support structure, and a floor attached to the frame. The floor includes a reactor access opening sized to permit access to the reactor pressure vessel.

DETAILED DESCRIPTION OF THE INVENTION

A reactor servicing platform having a reactor access opening to permit access to the reactor internal components during refueling and maintenance outage operations is described below in detail. The reactor servicing platform permits multiple work crews and equipment to simultaneously perform tasks at multiple azimuth locations around a reactor vessel. The reactor servicing platform is fabricated from any suitable material(s), for example, aluminum, steel, and thermoplastic and fiber composite materials. Further, the reactor servicing platform has a modular design with major components sized for transport to a reactor refuel floor through an equipment hatch. The reactor servicing is assembled in site in the reactor and can be disassembled and transported to another reactor.

Figure 1:
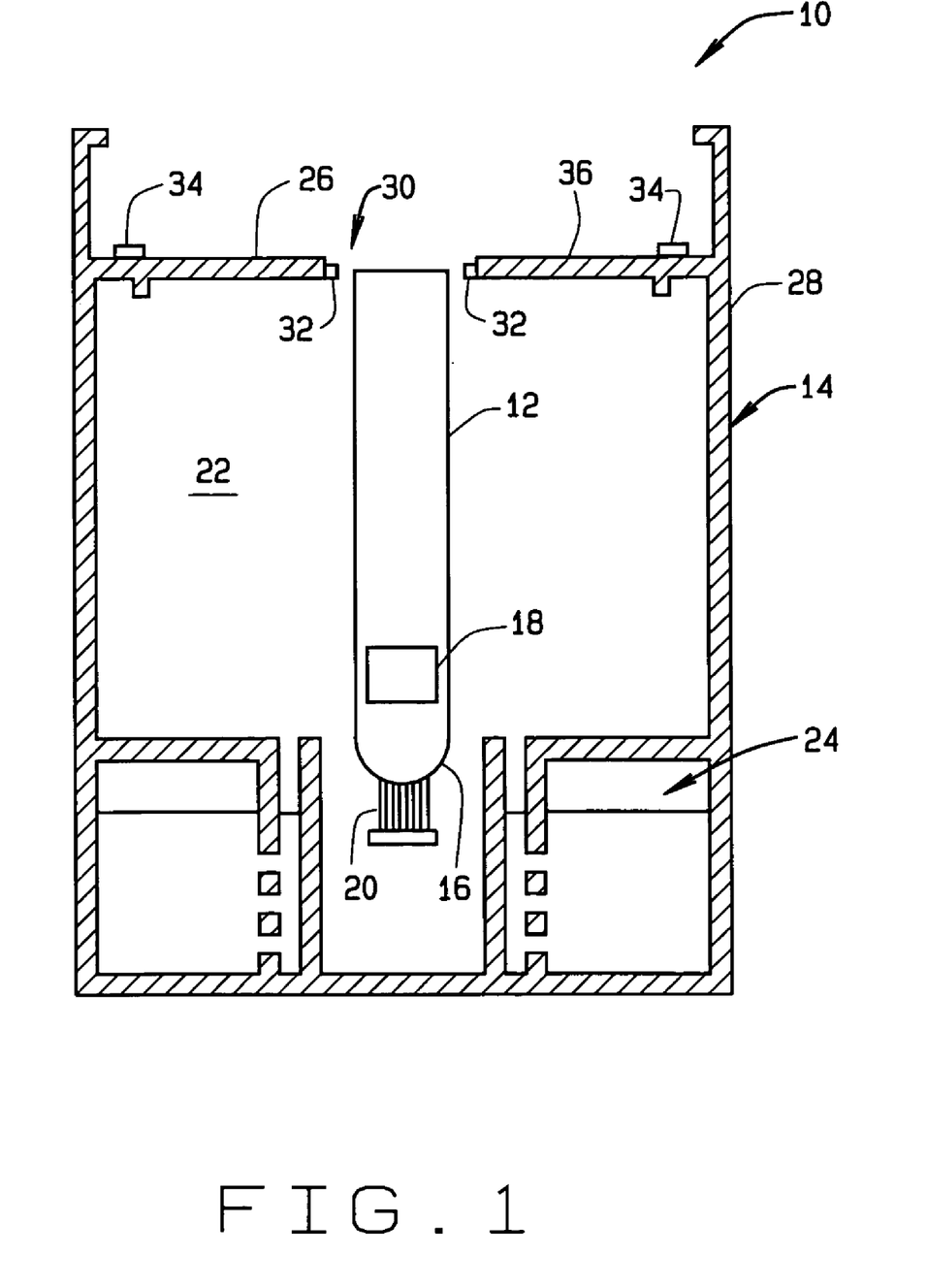
FIG. 1 is simplified schematic view of a nuclear reactor.

Referring specifically to the drawings, FIG. 1 is simplified schematic view of a nuclear reactor 10. Reactor 10 includes a reactor pressure vessel 12 positioned in a containment vessel 14. Reactor pressure vessel 12 has a generally cylindrical shape and includes a bottom head 16 and a removable top head (not shown). A reactor core 18 is located inside pressure vessel 12. A plurality of control rod drives 20 extend through bottom head 16 and control the position of the control rods (not shown) in core 18 which adjusts the reactivity of core 18.

Containment vessel 14 includes a drywell 22 in which pressure vessel 12 is located, and a wetwell 24. A refuel floor 26 extends from a side wall 28 of containment 14 and is located above pressure vessel 12. Refuel floor 26 permits worker access to pressure vessel 12 through an access opening 30 to perform refueling, maintenance, and other servicing functions of pressure vessel 12. A ledge 32 extends from refuel floor 26 into access opening 30. Crane rails 34 are located on an upper surface 36 of refuel floor 26.

Figure 2:
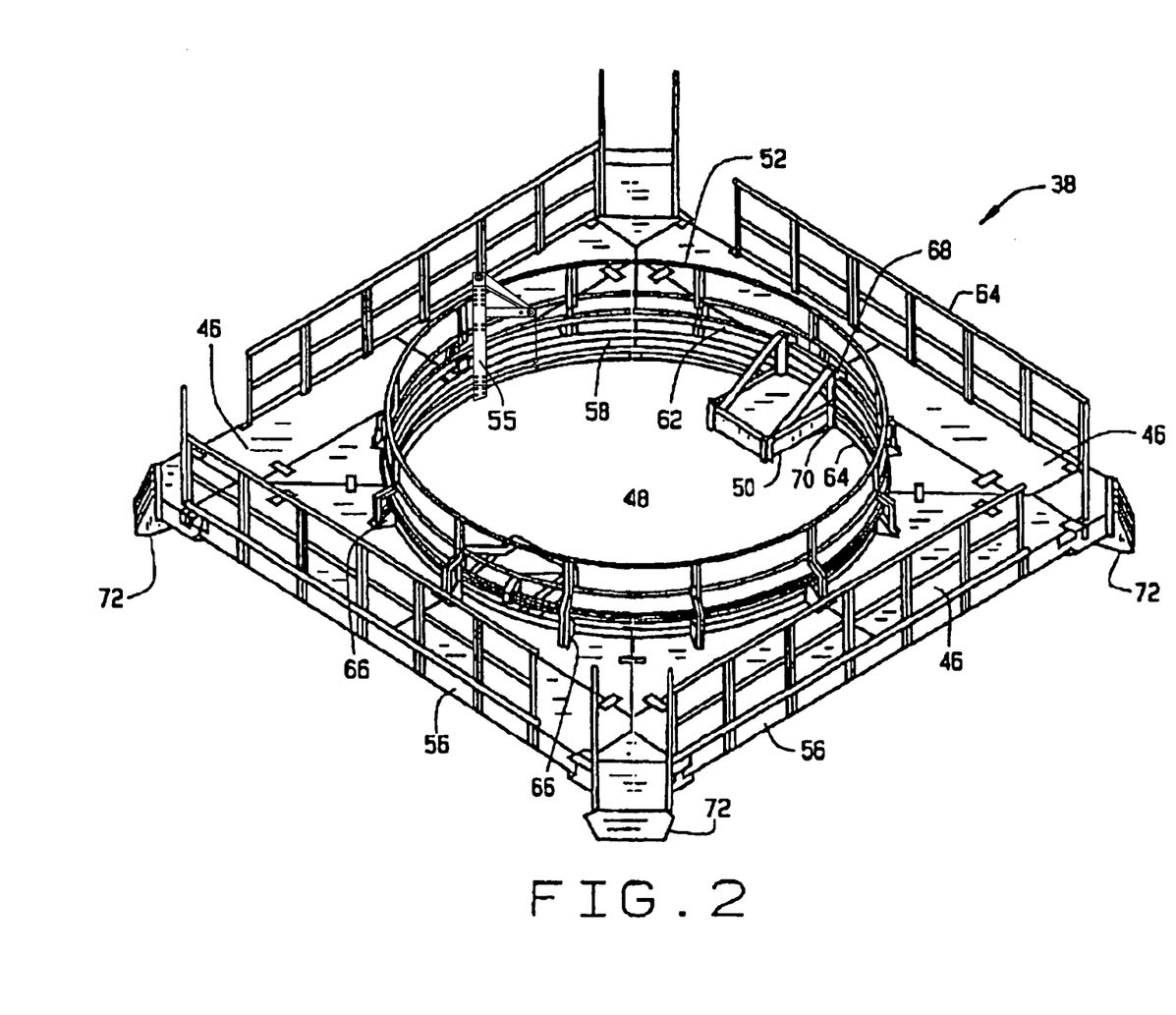
FIG. 2 is a perspective schematic view of a reactor servicing platform in accordance with an embodiment of the present invention.
Figure 3:
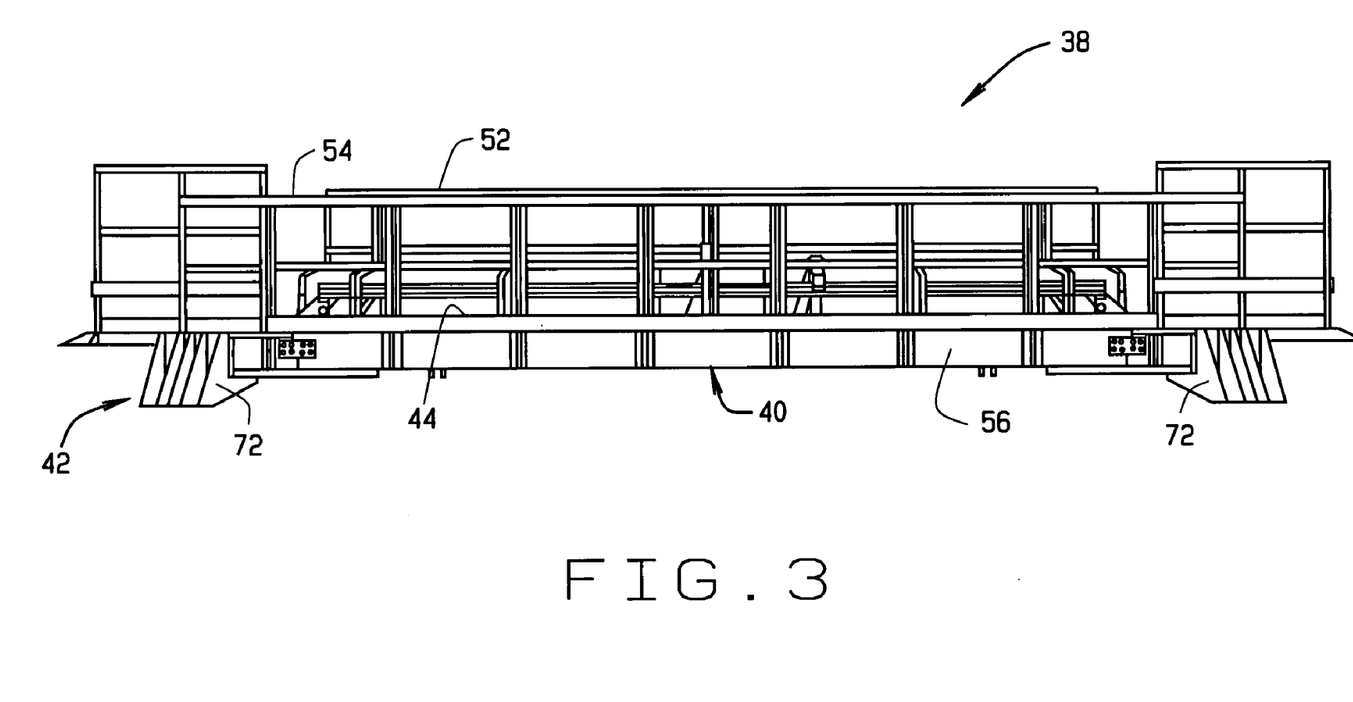
FIG. 3 is a side schematic view of the reactor servicing platform shown in FIG. 2.
Figure 4:
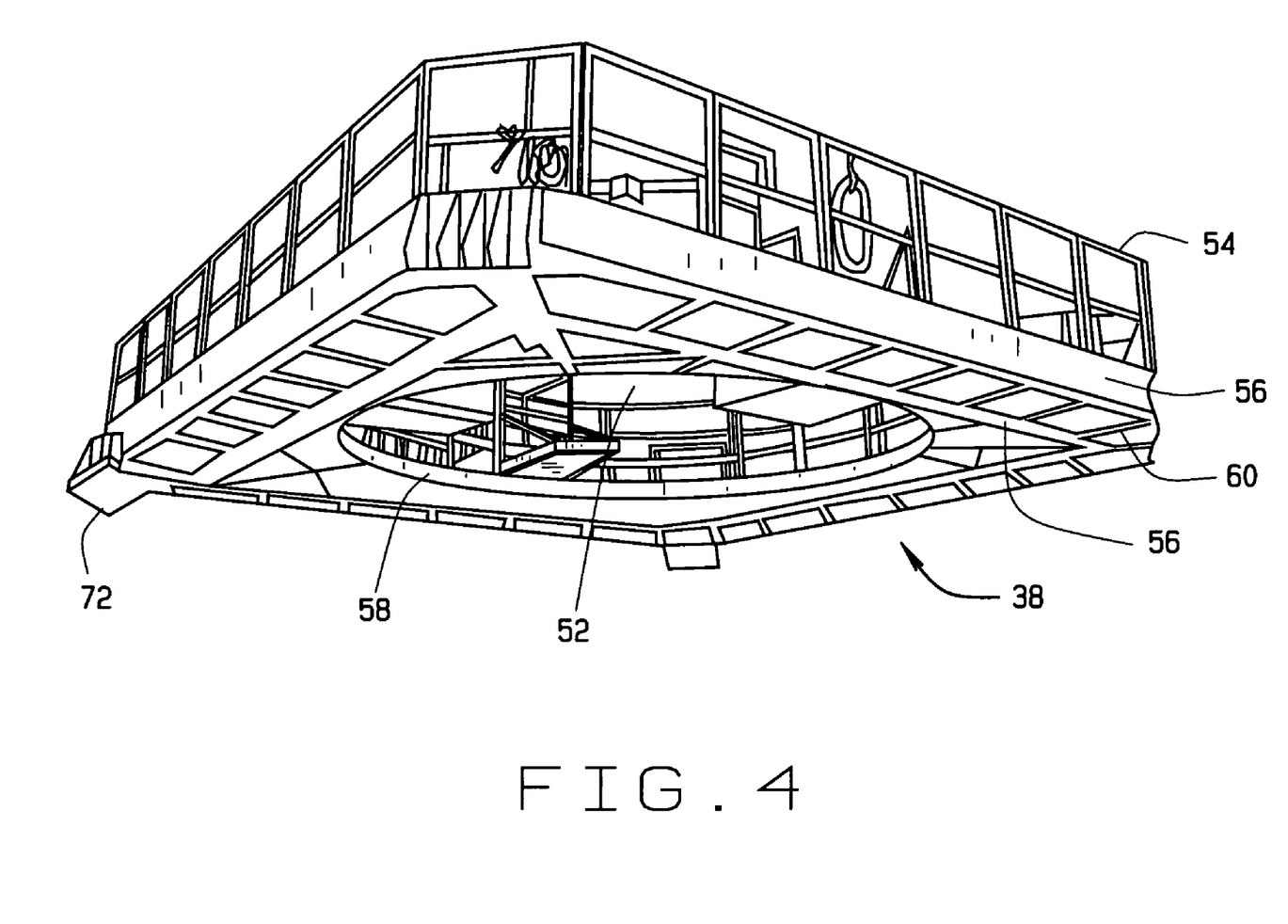
FIG. 4 is a bottom perspective view of the reactor servicing platform shown in FIG. 2.

FIG. 2 is a perspective schematic view of a reactor servicing platform 38 in accordance with an embodiment of the present invention. FIG. 3 is a side schematic view of reactor servicing platform 38, and FIG. 4 is a bottom perspective view of reactor servicing platform 38. Referring to FIGS. 2, 3, and 4, servicing platform 38 servicing platform 38 includes a frame 40, a support structure 42, and a floor 44 covering frame 40. Floor 44 is formed from a plurality of floor panels 46 attached to frame 40. Floor 44 includes a reactor access opening 48 sized to permit access to reactor pressure vessel 12. At least one auxiliary platform 50 (two shown) extends into access opening 48. Each auxiliary platform 50 is movable along a perimeter of access opening 48. Access opening 48 can be any suitable shape, for example, a circular, elliptical, or polygonal shape. A safety rail or fence 52 extends around a perimeter of access opening 48. Further, a safety rail or fence 54 extends around an outer perimeter of floor 44. In alternate embodiments, reactor servicing platform 38 also includes servicing tools, for example, lifting devices 55, that are movable along a perimeter of access opening 48.

Frame 40 includes a plurality of beams 56, a circular central beam 58 and a plurality of cross-members 60 extending between beams 56 and central beam 58. Circular central beam 58 defines reactor access opening 48. Floor panels 46 attach to beams 56, central beam 58, and cross-members 60 to form floor 44. Auxiliary platforms 50 movably couple to upper and lower support rails 62 and 64 that are coupled to circular central beam 58. Upper support rail 62 is coupled to central beam 58 by support brackets 66. Auxiliary platforms 50 include upper rollers 68 and lower rollers 70 that couple to upper and lower support rails 62 and 64 respectively and permit auxiliary platforms 50 to move along support rails 62 and 64 for positioning within reactor access opening 48. In an alternate embodiment, servicing tools, for example, lifting devices, are movably coupled to upper and lower support rails 62 and 64. Support structure 42 includes support pods 72 attached to frame 40. In one embodiment support pods rest on upper surface 36 of refuel floor 26 to support servicing platform 38 over pressure vessel 12.

Figure 5:
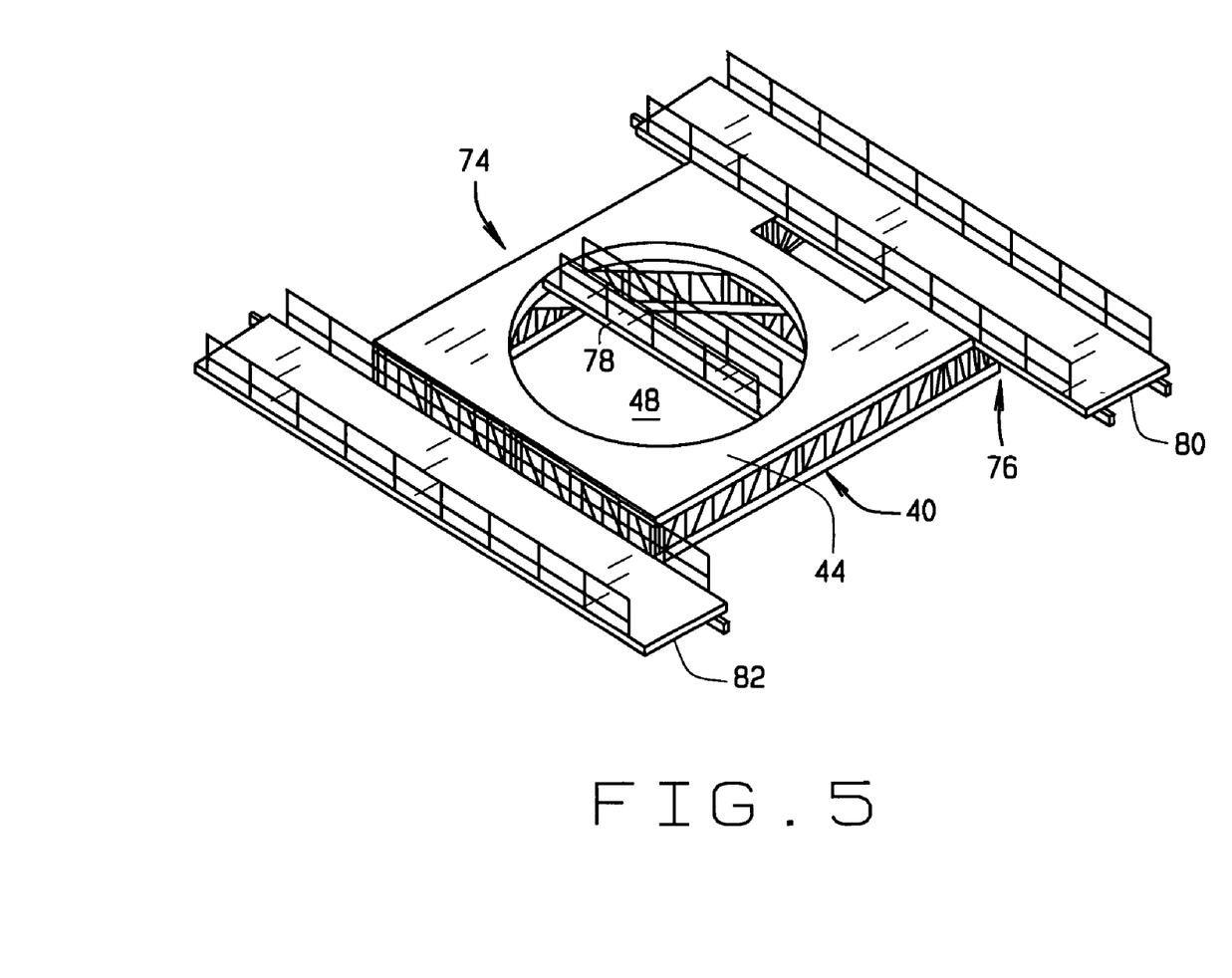
FIG. 5 is a top perspective schematic view of a reactor servicing platform in accordance with an embodiment of the present invention.

FIG. 5 is a top perspective schematic view of a reactor servicing platform 74 in accordance with another embodiment of the present invention. Servicing platform 74 is substantially similar to servicing platform 38, shown in FIGS. 2, 3, and 4, and components in servicing platform 74 that are identical to components of servicing platform 38 are identified in FIG. 5 using the same reference numerals used in FIGS. 2, 3, and 4. Servicing platform 74 includes a frame 40, a floor 44 covering frame 40, and a support structure 76. Floor 44 includes a reactor access opening 48 sized to permit access to reactor pressure vessel 12. An auxiliary platform 78 is movably coupled to frame 40 and extends across the diameter of access opening 48. Auxiliary platform 78 is movable around the perimeter of access opening 48. Support structure 76 attaches to existing reactor bridges 80 and 82 to suspend servicing platform 74 above reactor pressure vessel 12 (shown in FIG. 1).

Figure 6:
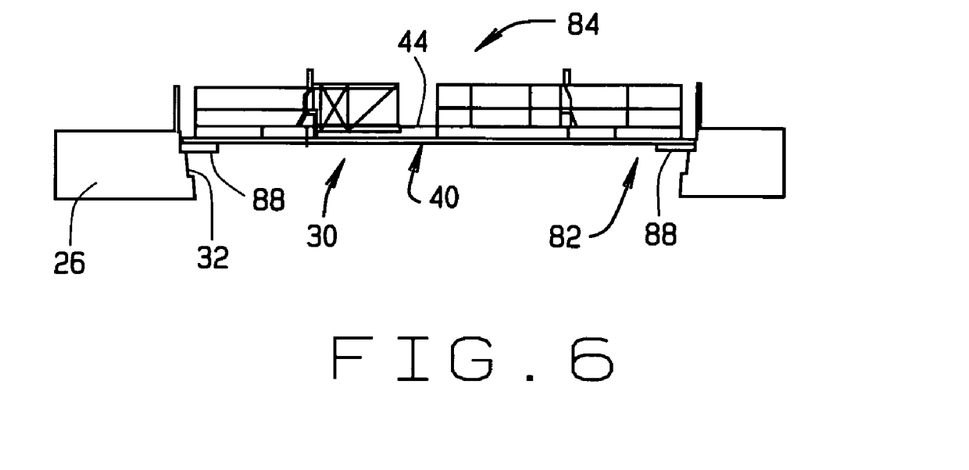
FIG. 6 is a side schematic view of a reactor servicing platform in accordance with an embodiment of the present invention.

FIG. 6 is a side schematic view of a reactor servicing platform 84 in accordance with an embodiment of the present invention. Servicing platform 84 is substantially similar to servicing platform 38, shown in FIGS. 2, 3, and 4, and components in servicing platform 84 that are identical to components of servicing platform 38 are identified in FIG. 6 using the same reference numerals used in FIGS. 2, 3, and 4. Servicing platform 84 includes a frame 40, a floor 44 covering frame 40, and a support structure 86. Support structure 86 includes support pods 88 attached to frame 40. Support pods 88 are sized and positioned to rest on ledge 32 extending around access opening 30 in refuel floor 26 to support servicing platform 84 over pressure vessel 12 (shown in FIG. 1).

Figure 7:
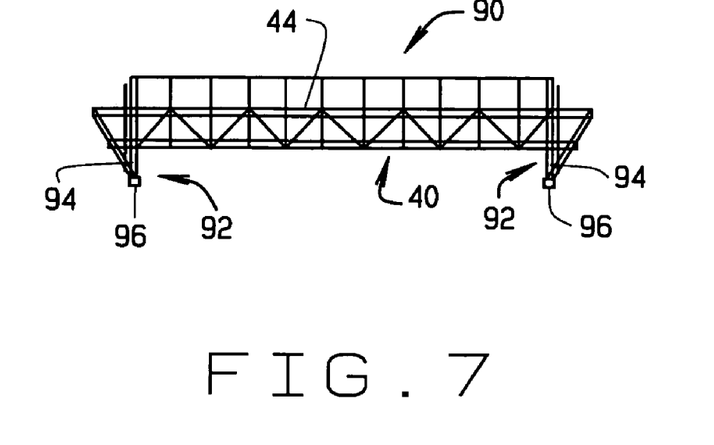
FIG. 7 is a side schematic view of a reactor servicing platform in accordance with an embodiment of the present invention.

FIG. 7 is a side schematic view of a reactor servicing platform 90 in accordance with an embodiment of the present invention. Servicing platform 90 is substantially similar to servicing platform 38, shown in FIGS. 2, 3, and 4, and components in servicing platform 90 that are identical to components of servicing platform 38 are identified in FIG. 7 using the same reference numerals used in FIGS. 2, 3, and 4. Servicing platform 90 includes a frame 40, a floor 44 covering frame 40, and a support structure 92. Support structure 92 includes support members 94 attached to frame 40. Each support member 94 includes wheels 96 sized to engage and roll on crane rails 34 (shown in FIG. 1) attached to refuel floor upper surface 36 (shown in FIG. 1).

The above described servicing platforms 38, 74, 84, and 90, permit access to the reactor along the radial and tangential directions of the vessel or component. The above described servicing platforms 38, 74, 84, and 90 permit radial and tangential alignment simultaneously. Further, the above described servicing platforms 38, 74, 84, and 90 improve plant outage schedules, work productivity, and quality by providing a work platform that permits multiple work crews and equipment to simultaneously perform tasks at multiple azimuths around a reactor vessel While the invention has been described in terms of various specific embodiments, those skilled in the art will recognize that the invention can be practiced with modification within the spirit and scope of the claims.

What is claimed is:

1. A method of servicing a nuclear reactor during a reactor outage, the reactor comprising a primary containment vessel and a reactor pressure vessel positioned in the primary containment vessel, said method comprising:
   positioning a servicing platform above the reactor pressure vessel, the servicing platform comprising:
      a frame comprising a plurality of interconnected beams;
      a support structure attached to the frame;
      a floor attached to a top of the frame, the floor comprising a reactor access opening sized to permit access to the reactor pressure vessel; and
      at least one auxiliary platform movably coupled to the frame and extending into the access opening, the at least one auxiliary platform movable along a perimeter of the access opening of the floor; and
   performing predetermined servicing operations on the reactor.

2. A method in accordance with claim 1 wherein the servicing platform access opening has a circular, elliptical, or polygonal shape.

3. A method in accordance with claim 1 wherein the servicing platform comprises at least one of steel, aluminum, and a thermoplastic and fiber composite material.

4. A method in accordance with claim 1 wherein the reactor comprises at least two refuel bridges spaced apart and located in the primary containment above the reactor pressure vessel, and positioning a servicing platform above the reactor pressure vessel comprises positioning the servicing platform with the servicing platform support structure engaging the refuel bridges to suspend the servicing platform from the two spaced apart refuel bridges.

5. A method in accordance with claim 1 wherein the primary containment comprises a refuel floor located above the pressure vessel, the refuel floor comprising a plurality of crane rails, the support structure comprising a plurality of wheels, and positioning a servicing platform above the reactor pressure vessel comprises positioning the servicing platform with the servicing platform support structure wheels engaging the crane rails.

6. A method in accordance with claim 1 wherein the primary containment comprises a refueling floor located above the pressure vessel, and positioning a servicing platform above the reactor pressure vessel comprises positioning the servicing platform with the servicing platform support structure engaging the refueling floor to support the servicing platform above the pressure vessel.

7. A method in accordance with claim 6 wherein the refuel floor comprises a pressure vessel access opening and a ledge extending circumferentially around the pressure vessel access opening, and positioning a servicing platform above the reactor pressure vessel comprises positioning the servicing platform with the servicing platform support structure engaging the ledge to support the servicing platform above the pressure vessel.

8. A method in accordance with claim 1 wherein the servicing platform further comprises at least one lifting device movably coupled to the frame, the at least one lifting device movable along a perimeter of the access opening.

9. A method in accordance with claim 1 wherein positioning a servicing platform above the reactor pressure vessel comprises:

assembling the reactor servicing platform inside the primary containment vessel; and moving the reactor servicing platform into position above the reactor pressure vessel.

10. A method in accordance with claim 9 wherein assembling the reactor servicing platform inside the primary containment vessel comprises coupling modular sections of the reactor servicing platform together, each modular section comprising at least one of a portion of the frame, a portion of the support structure, and a portion of the floor.

* * * * *